(12) United States Patent
He

(10) Patent No.: US 12,363,675 B2
(45) Date of Patent: Jul. 15, 2025

(54) PAGING EARLY INDICATION

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 547 days.

(21) Appl. No.: 17/651,053

(22) Filed: Feb. 14, 2022

(65) Prior Publication Data
US 2022/0312369 A1  Sep. 29, 2022

Related U.S. Application Data

(60) Provisional application No. 63/167,610, filed on Mar. 29, 2021.

(51) Int. Cl.
*H04W 68/00* (2009.01)
(52) U.S. Cl.
CPC .................. *H04W 68/005* (2013.01)
(58) Field of Classification Search
CPC .............................. H04W 72/23; Y02D 30/70
See application file for complete search history.

(56) References Cited

U.S. PATENT DOCUMENTS

| 2016/0338006 | A1* | 11/2016 | Lee | H04W 52/0229 |
| 2022/0232514 | A1* | 7/2022 | Tseng | H04W 60/00 |
| 2023/0144750 | A1* | 5/2023 | Agiwal | H04W 48/14 |
| | | | | 455/422.1 |
| 2023/0146553 | A1* | 5/2023 | Liao | H04W 68/02 |
| | | | | 370/329 |
| 2024/0064700 | A1* | 2/2024 | Zhang | H04W 52/0216 |

OTHER PUBLICATIONS

Huahei., et al., "Paging Enhancements for Idle/Inactive-Mode UE", 3GPP TSG-RAN WG2 Meeting #113 electronic, 3GPP Draft, R2-2101274, 3GPP, vol. RAN WG2, No. electronic, Jan. 25, 2021-Feb. 5, 2021, Jan. 15, 2021 (Jan. 15, 2021), 9 Pages, XP051974223, Retrieved from the Internet: URL: https://ftp.3gpp.org/tsg_ran/WG2_RL2/TSGR2_113-e/Docs/R2-2101274.zip, R2-2101274, Paging enhancements for idle_inactive-mode UE.docx [retrieved on Jan. 15, 2021], Sections 2.1, 2.2, figure 4.

(Continued)

*Primary Examiner* — Fabricio R Murillo Garcia
(74) *Attorney, Agent, or Firm* — Procopio, Cory, Hargreaves & Savitch LLP

(57) ABSTRACT

A base station may transmit a paging early indication (PEI) indicating whether the user equipment (UE) has a paging message for reception associated with each paging occasion (PO) of a set of POs including a plurality of POs, and transmit paging messages associated with the POs of the set of POs based on the PEI transmitted for the UE. The base station may transmit system information including PEI parameters. The UE may receive the PEI parameters and receive the PEI indicating whether the UE has a paging message for reception associated with each PO of a set of POs based on the PEI parameters, determining whether to monitor the POs of the set of POs based on the received PEI, and monitor or skipping monitoring the POs of the set of POs based on the determination of whether to monitor each PO of the set of POs.

26 Claims, 11 Drawing Sheets

(56) References Cited

OTHER PUBLICATIONS

International Search Report and Written Opinion—PCT/US2022/016482—ISA/EPO—May 17, 2022.
Nokia., et al., "Details on Paging Sub-Grouping Indication and Determination", 3GPP TSG-RAN WG2 Meeting #113 Electronic, 3GPP Draft, R2-2101148, 3GPP, vol. RAN WG2, No. Electronic, Jan. 25, 2021-Feb. 5, 2021, Jan. 15, 2021 (Jan. 15, 2021), 2 Pages, XP051974142, Retrieved from the Internet: URL: https://ftp.3gpp.org/tsg_ran/WG2_RL2/TSGR2_113-e/Docs/R2-2101148.zip, R2-2101148 Details on paging sub-grouping indication and determination.docx [retrieved on Jan. 15, 2021], Section 2.1.
Vivo: "Paging Enhancements for Idle/Inactive Mode UE Power Saving", 3GPP TSG RAN WG1#104-e, 3GPP Draft, R1-2100452, 3GPP, vol. RAN WG1, No. e-Meeting, Jan. 25, 2021-Feb. 5, 2021, Jan. 18, 2021 (Jan. 18, 2021), 16 Pages, XP051970374, Retrieved from the Internet: URL: https://ftp.3gpp.org/tsg_ran/WG1_RL1/TSGR1_104-e/Docs/R1-2100452.zip, R1-2100452 Paging enhancements for idle inactive mode UE power saving.docx [retrieved on Jan. 18, 2021], Section 3.3.1, figure 9.

\* cited by examiner

PAGING EARLY INDICATION

CROSS REFERENCE TO RELATED APPLICATION(S)

This application claims the benefit of and priority to U.S. Provisional Application Ser. No. 63/167,610, entitled "PAGING EARLY INDICATION" and filed on Mar. 29, 2021, which is expressly incorporated by reference herein in its entirety.

TECHNICAL FIELD

The present disclosure relates generally to communication systems, and more particularly, to a wireless communication including a paging early indication (PEI).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and a user equipment (UE). The base station may transmit a PEI indicating whether the UE has a paging message for reception associated with each paging occasion (PO) of a set of POs including a plurality of POs, and transmit paging messages associated with the POs of the set of POs based on the PEI transmitted to the UE. The base station may transmit system information including PEI parameters. The UE may receive the PEI parameters and receive the PEI indicating whether the UE has a paging message for reception associated with each PO of a set of POs based on the PEI parameters, determining whether to monitor the POs of the set of POs based on the received PEI, and monitor or skip monitoring the POs of the set of POs based on the determination of whether to monitor each PO of the set of POs.

In one aspect, the system information may indicate a number M associated with a number of POs in the set of POs, and a number N associated with a PEI periodicity in which PEIs are received every N POs. The M may be a multiple of N and a number M/N corresponds to a number of PEIs that include the same information associated with each PO of the set of POs. In one example, the number M associated with the number of POs may be equal to the number N associated with the PEI periodicity. The system information may further indicate a number K associated with a PO offset from each PEI and the PO associated with each PEI.

In some aspects, the PEI may include at least one of a system information modification message or a public warning message and a bitmap, each bit indicating whether the corresponding PO of the set of POs includes a paging message for the UE or a UE group associated with the UE. The monitoring or skipping monitoring may include monitoring at least one PO that the bitmap indicates is associated with the paging message for the UE or the UE group associated with the UE, and skipping monitoring one or more POs that the bitmap indicates are not associated with the paging message for the UE or the UE group associated with the UE. In one aspect, at least one bit of the bitmap may indicate that the corresponding PO of the set of POs is not associated with the PEI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
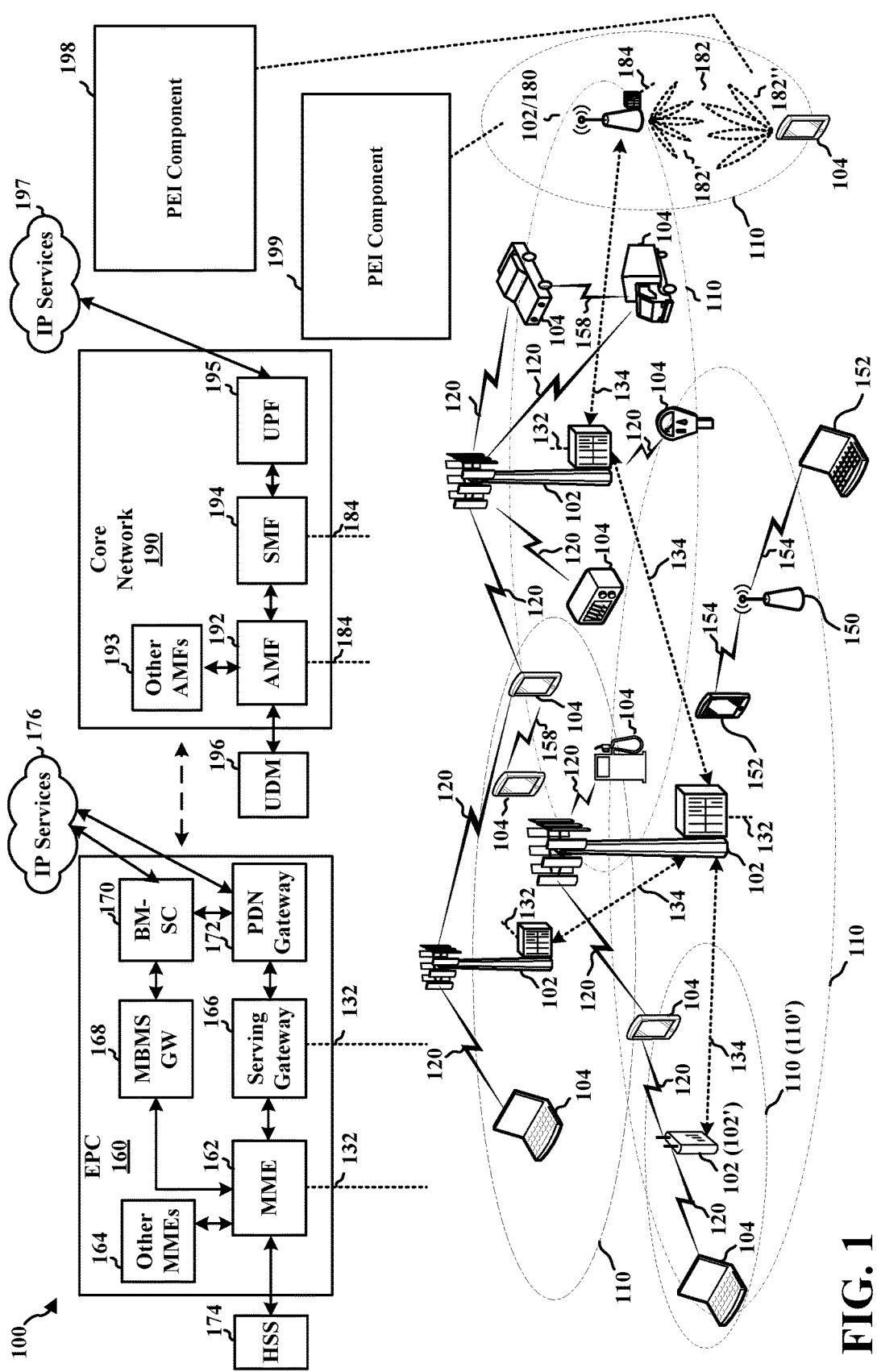
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a PEI component 198 configured to receive a PEI indicating whether the UE has a paging message for reception associated with each PO of a set of POs including a plurality of POs, determine whether to monitor the POs of the set of POs based on the received first PEI, and monitor or skip monitoring the POs of the set of POs based on the determination of whether to monitor each PO of the set of POs. In certain aspects, the base station 180 may include a PEI component 199 configured to transmit a PEI indicating whether the UE has a paging message for reception associated with each PO of a set of POs, the set of POs including a plurality of POs, and transmit paging messages associated with the POs of the set of POs based on the PEI transmitted to the UE. Although the following description may be focused on 5G NR, the concepts described herein may be applicable to other similar areas, such as LTE, LTE-A, CDMA, GSM, and other wireless technologies.

Figure 2:
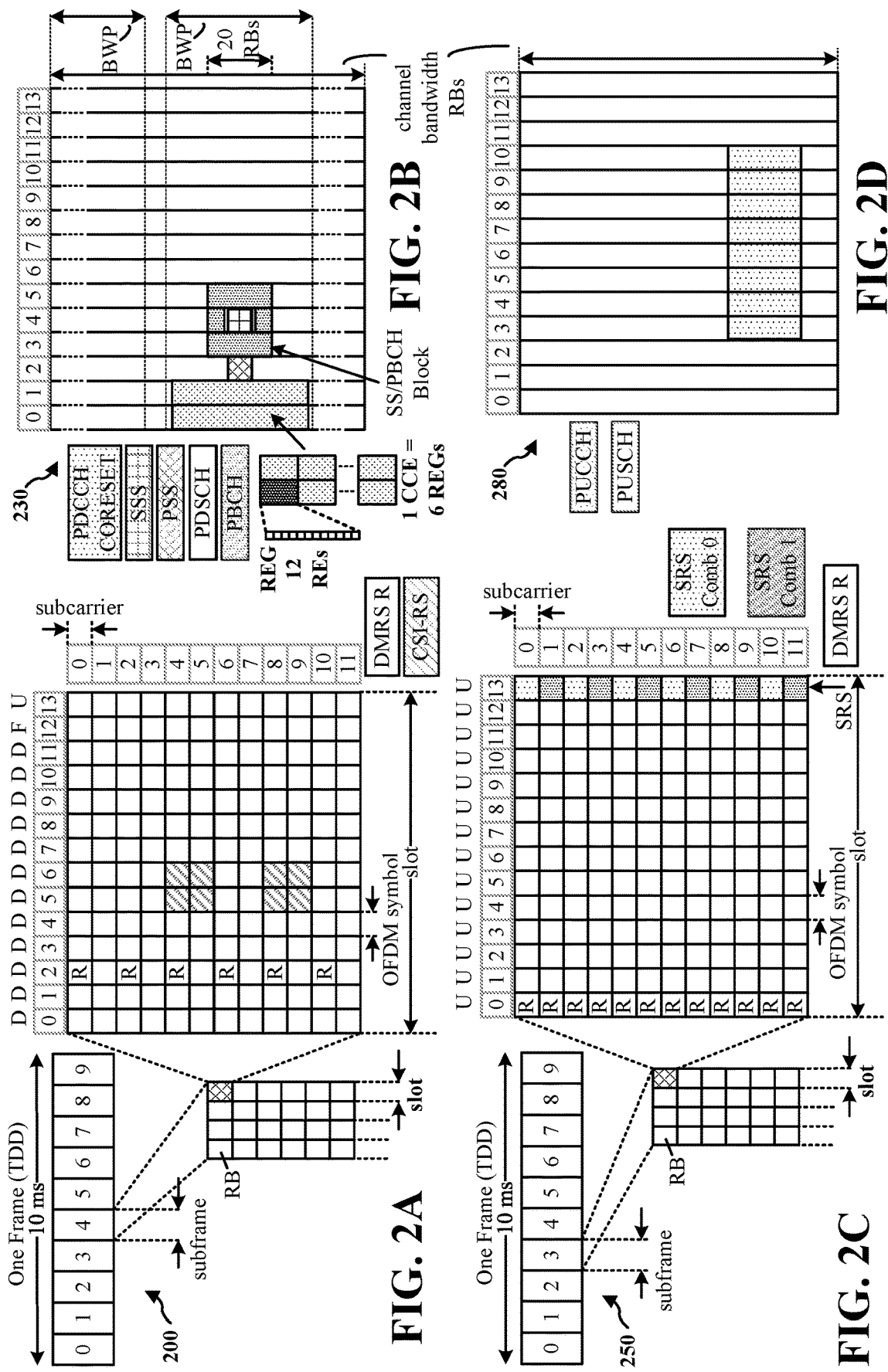
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
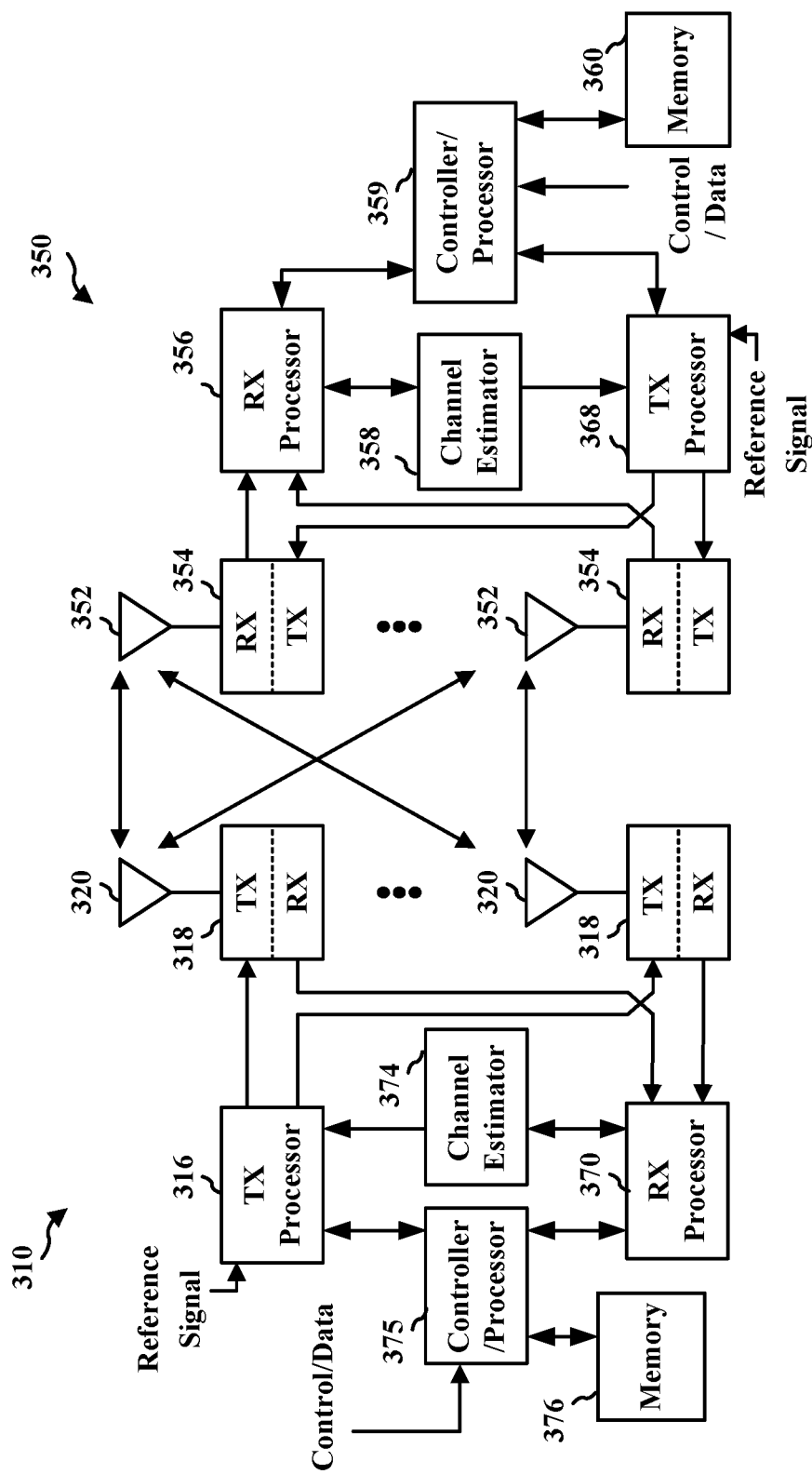
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects, UEs in RRC idle/inactive mode may periodically (or aperiodically) wake up to receive paging messages from the base station, and the base station may transmit the paging messages to the UEs in the RRC idle/inactive mode. That is, the base station may transmit a paging indication in a control channel, e.g., a PDCCH, in a PO and transmit the paging message based on the associated paging indication received in the PO. The paging message may be transmitted in a data channel, e.g., PDSCH, in the same PO as the associated paging indication or in a different PO. The UE may monitor the PO for the paging indication and decode the paging message based on the received paging indication in the PO.

In some instances, an enhanced configuration for paging messages may be provided to improve the power efficiency by reducing the power consumption of transmitting and receiving paging messages. For example, reducing the number of paging messages transmitted by the base station and received by the UE may reduce the power consumption and increase the power efficiency for the base station and the UE.

In some aspects, a paging early indication (PEI) may be provided to reduce false paging reception. The network, including the base station, may send the PEI before UE's paging occasion (PO) and indicate whether the UE has a paging message schedule for transmissions on the corresponding PO. Accordingly, UEs indicated by the PEI that the base station will not transmit a page message may not need to wake up to monitor the corresponding PO and may have a reduced power consumption.

In one aspect, the base station may provide multiple opportunities for the UEs to receive the PEI to increase the reliability of a paging reception. That is, the base station may transmit multiple PEIs that includes the same indication for each PO to increase the reliability of PEI transmission and reception, and the reliability of the corresponding paging message reception may be improved, especially for UEs located at a cell edge or with a poor radio link quality due to interferences.

In another aspect, transmitting the EPO may be resource expensive in NR because any paging indication including the PEI is broadcasted on every DL beam, i.e., beam sweep and/or with an increased or high aggregation level to increase its successful reception even if the UE is located at the cell edge.

Accordingly, an enhanced PEI may be provided for the base station to send the PEI before every few POs instead of every PO, and each PEI may include indications for multiple POs.

Figure 4:
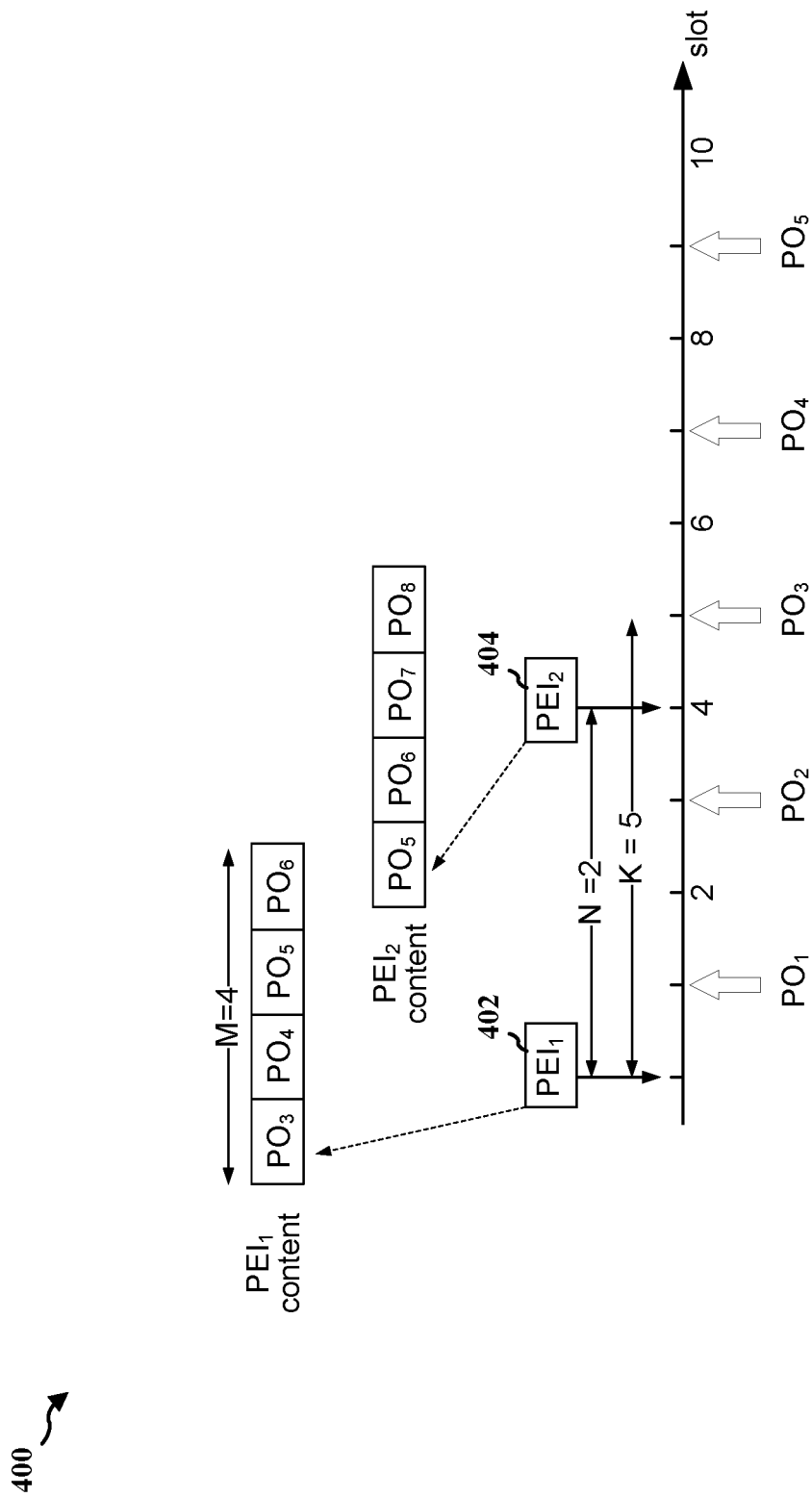
FIG. 4 illustrates an example of a method of wireless communication including PEIs.

FIG. 4 illustrates an example 400 of a method of wireless communication including PEIs. The example 400 may include a first PEI 402 and a second PEI 404 transmitted from the base station and received by the UE.

In one aspect, the PEIs may be sent every N POs and each PEI may be sent K slots before the first PO that the corresponding PEI covers, where N and K are integers (N>1 and K≥0). That is, the base station may transmit the PEIs every N POs, where each PEI is transmitted K slots prior to the first PO covered by the corresponding PEI. In another aspect, each PEI may include a paging indication for M POs, where M may be a multiple of N. That is, M/N number of PEIs may include a paging indication for each PO. In one aspect, the M may be equal to N, and the number of POs associated with each PEI be the equal to the periodicity of the PEI. That is, one (1) PEI may be associated with each paging indication for each PO, and each paging indication may be transmitted in one (1) PEI.

FIG. 4 provides that the PEIs may be sent every 2 POs, each PEI may be sent 5 slots before the first PO that the corresponding PEI covers and a PO may be available every 2 slots. That is, the base station may transmit the PEIs every 2 slots, where each PEI is transmitted 5 slots prior to the first PO covered by the corresponding PEI. In another aspect, each PEI may include the paging indication for 4 POs, and 2 PEIs may include the paging indication for each PO. The first PEI 402 may be transmitted on slot 0, including the paging indication for 4 POs including $PO_3$, $PO_4$, $PO_5$, and $PO_6$, while the second PEI 404 may be transmitted on slot 4, including the paging indication for 4 POs including $PO_5$, $PO_6$, $PO_7$, and $POs$.

Based on the above, the PDCCH signaling overhead for the base station may be reduced by a factor of N, and the reliability of the paging message transmission may theoretically be increased by a factor of M/N.

The base station may determine the parameters for transmitting the PEI to the UE and advertise the PEI parameters, e.g., M, N, or K, in system information. Based on the advertised M, N, and K, the UE may calculate in which time locations the base station may send at least one PEI associated with the POs. The UE may receive at least one PEI associated with the POs based on the calculation.

In one aspect, if POs are available every T slots and POs have a start offset of z, the UE may calculate that the PEI associated with a PO located in slot j may be in the following slots:

$$j-\mathrm{mod}(j-z, N*T)-K-N*T*i, \text{ (where } i=0, \ldots, M/N-1\text{)}.$$

Referring to example 400 of FIG. 4, M=4, N=2, K=5, T=2, and z=1. Accordingly, the UE may calculate and locate the PEI associated with the PO located in slot j in the slots: j−mod(j−1,4)−5−4i, (where i=0, 1). For example, if the UE wants to locate the PEIs for $PO_5$ at slot 9, the UE may find the PEIs including paging indication associated with the $PO_5$ in slot 0 and slot 4, i.e., (9−mod (8,4)−5−4i) (i=0, 1). For another example, if the UE wants to locate the PEIs for $PO_6$ at slot 11, the UE may locate the PEIs including a paging indication associated with the $PO_5$ in slot 0 and slot 4, e.g., (11−mod (10,4)−5−4i) (i=0, 1).

In another aspect, M and N may be equal to each other. That is, the number of POs associated with each PEI and the periodicity of the PEI may have the same value N, and That is, one (1) PEI may be associated with each paging indication for each PO, and each paging indication may be transmitted in one (1) PEI Accordingly, if POs are available every T slots and POs have a start offset of z, the UE may calculate that the PEI associated with a PO located in slot j may be in the following slots:

$$j-\mathrm{mod}(j-z, N*T)-K.$$

For example, the base station may configure the UE with the following PEI parameters: M=N=2, K=5, T=2, and z=1. Accordingly, the UE may calculate and locate the PEI associated with the PO located in slot j in the slots: j−mod (j−1,4)−5. For example, if the UE wants to locate the PEIs for $PO_5$ at slot 9, the UE may find the PEIs including paging indication associated with the $PO_5$ in slot 4, i.e., 9−mod (8,4)−5=4. For another example, if the UE wants to locate the PEIs for $PO_6$ at slot 11, the UE may locate the PEIs including a paging indication associated with the $PO_5$ in slot 4, e.g., 11−mod (10,4)−5=11−2−5=4.

In one aspect, the UE may also be configured to determine which PEI to decode to obtain the paging indication for the associated PO. That is, more than one PEI may be associated with each PO, and the UE may decide not to decode all of the more than one PEIs associated with a PO. The UE may further reduce the power consumption for waking up to receive the PEI and further increase the power consumption.

The PEI may be associated with a set of POs, including multiple POs. In some aspects, each PEI may include at least one of a message including a system information modification or a public warning message, e.g., an earthquake and tsunami warning system (ETWS)/commercial mobile alert system (CMAS) notification, or a bitmap of paging indications. In one aspect, the message including the system information modification or the public warning message may include a bit indicating whether the message indicates the system information modification or the message indicates the public warning message.

In another aspect, the bitmap of the paging indication may include at least one bit corresponding to each PO in the set of POs associated with the PEI. That is, the PEI may include a bitmap indicating which PO of the set of POs associated with the PEI is associated with the UE.

In some aspects, a group of UEs may be located within the same paging location, and the base station may transmit a paging message to the group of UEs that share the same paging location. The bitmap may also indicate which UE is associated with which PO of the set of the POs. Accordingly, the UE in the UE group sharing the same paging location may determine which PO is associated with the UE and monitor, among the set of POs, the PO associated with the UE.

In one aspect, the bitmap may indicate that the network may not send the PEI for the corresponding PO. That is, the bitmap may indicate that the corresponding PO of the set of POs may not be associated with a PEI. The base station may reduce the power consumption by not transmitting a PEI to a UE that may not have the capability to support the PEI.

Figure 5:
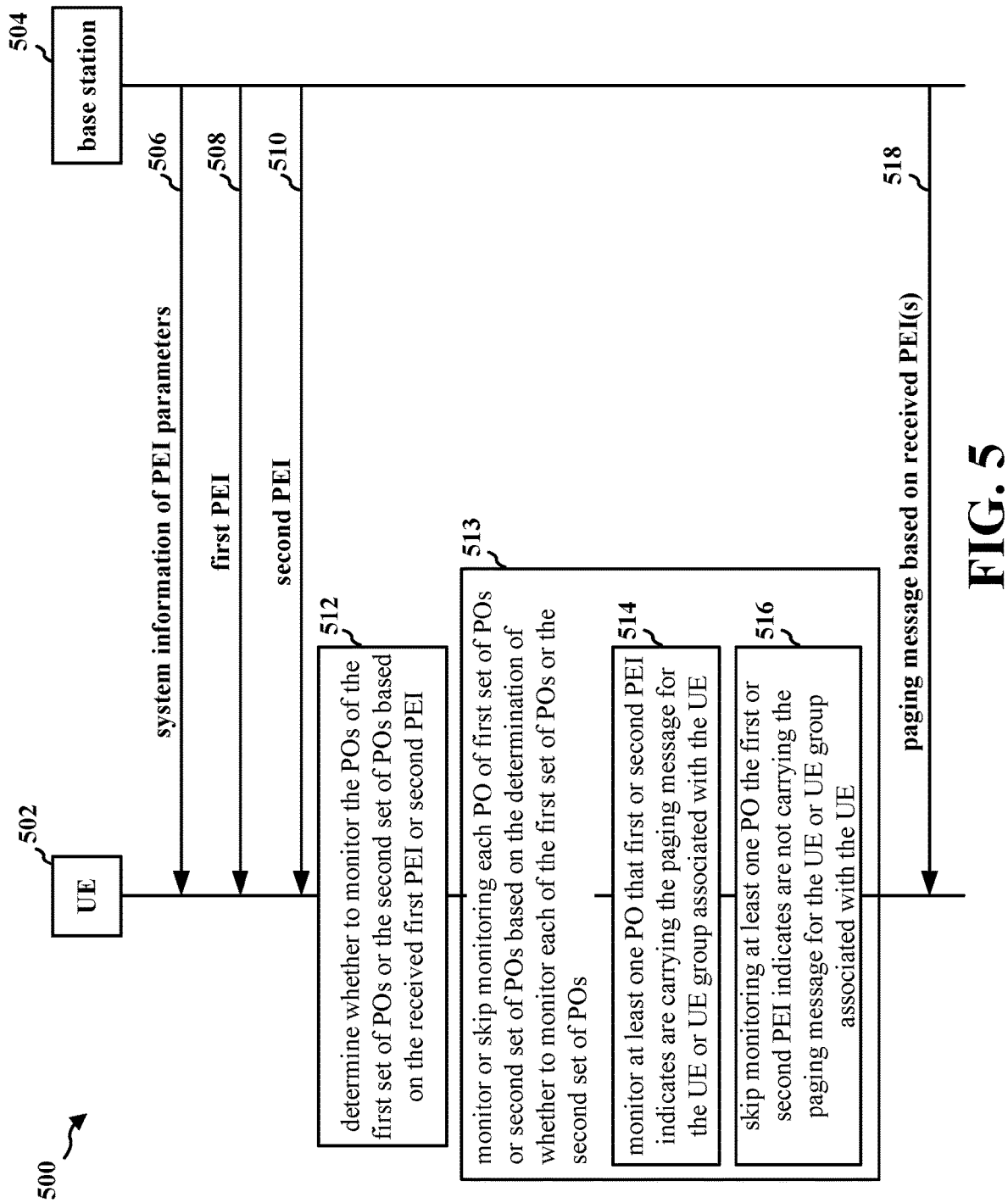
FIG. 5 is a communication diagram of a method of wireless communication.

FIG. 5 is a communication diagram 500 of a method of wireless communication. The communication diagram 500 may include a UE 502 and a base station 504. The base station 504 may transmit a PEI indicating whether the UE has a paging message for reception associated with each PO of a set of POs including a plurality of POs, and transmit paging messages associated with the POs of the set of POs based on the PEI transmitted to the UE 502. The base station 504 may transmit system information including PEI parameters. The UE 502 may receive the PEI parameters and receive the PEI indicating whether the UE 502 has a paging message for reception associated with each PO of a set of POs based on the PEI parameters, determining whether to monitor the POs of the set of POs based on the received first PEI, and monitor or skip monitoring the POs of the set of POs based on the determination of whether to monitor each PO of the first set of POs.

At 506, the base station 504 may transmit system information indicating PEI parameters for communicating the PEI, and the UE 502 may receive the system information indicating the parameters for the PEI. In some aspects, the PEI parameters may include a number M associated with a number of POs in the first set of POs and a number N associated with a PEI periodicity in which PEIs are received every N POs. In one aspect, M may be a multiple of N, and a number M/N may correspond to a number of PEIs that include the same information associated with each PO of the first set of POs. In one example, the M may be equal to N, and the number of POs associated with each PEI be the equal to the periodicity of the PEI. That is, one (1) PEI may be associated with each paging indication for each PO, and each paging indication may be transmitted in one (1) PEI. In one aspect, the PEI parameters may include a number K associated with a PO offset from each PEI and the first PO associated with each PEI.

At 508, the base station 504 may transmit a first PEI indicating whether the UE 502 has a paging message for reception associated with each PO of the first set of POs, the first set of POs including a first plurality of POs. The UE 502 may receive the first PEI indicating whether the UE 502 has a paging message for reception associated with each PO of the first set of POs, the first set of POs including a first plurality of POs. In one aspect, the base station 504 may transmit the first PEI based on the system information transmitted at 506, and the UE 502 may receive the first PEI based on the received system information received at 506. In some aspects, the PEI may include at least one of a message including a system information modification or a public warning message, or a bitmap of the paging indications. In one aspect, the first PEI may include at least one of a system information modification message or a public warning message. The UE 502 may determine to perform system information modification or receive the public warning message based on the first PEI including at least one of the system information modification message or the public warning message.

At 510, the base station 504 may transmit a second PEI subsequent to the first PEI, indicating whether the UE 502 has a paging message for reception associated with each PO of the second set of POs, the second set of POs including a second plurality of POs. The UE 502 may receive the second PEI indicating whether the UE 502 has a paging message for reception associated with each PO of the second set of POs, the second set of POs including a second plurality of POs. In one aspect, the base station 504 may transmit the second PEI based on the system information transmitted at 506, and the UE 502 may receive the second PEI based on the received system information received at 506. In one aspect, the first set of POs and the second set of POs may include a common subset of POs. In some aspects, the PEI may include at least one of a message including a system information modification or a public warning message, or a bitmap of the paging indications. In one aspect, the second PEI may include at least one of a system information modification message or a public warning message. The UE 502 may determine to perform system information modification or receive the public warning message based on the second PEI including at least one of the system information modification message or the public warning message.

At 512, the UE 502 may determine whether to monitor the POs of the first set of POs or the second set of POs based on at least one of the first PEI or the second PEI received from the base station 504. In some aspects, the bitmap of the paging indication in the PEI may include at least one bit corresponding to each PO in the set of POs associated with the PEI. That is, the PEI may include a bitmap indicating which PO of the set of POs associated with the PEI is associated with the UE 502. In some aspects, the bitmap may also indicate which UE 502 of a UE group is associated with which PO of the set of the POs. Accordingly, the UE 502 in the UE group sharing the same paging location may determine which PO is associated with the UE 502 and monitor, among the set of POs, the PO associated with the UE 502. In one aspect, the bitmap may include at least one bit indicating that the corresponding PO of the set of POs is not associated with the first PEI.

At 513, the UE 502 may monitor or skip monitoring the POs of the first set of POs and/or the POs of the second set of POs based on the determination of whether to monitor each PO of the first set of POs or the second set of POs.

At 514, the UE 502 may monitor at least one PO that the bitmap of the PEI indicates is associated with the paging message for the UE 502 or the UE group associated with the UE 502. The UE group associated with the UE 502 may refer to a paging subgroup that the UE 502 is associated with. At 516, the UE 502 may skip monitoring one or more POs that the bitmap of the PEI indicates may not be associated with the paging message for the UE 502 or the UE group, including the UE 502.

At 518, the base station 504 may transmit paging messages associated with the POs of the first set of POs or the second set of POs based on at least one of the first PEI or the second PEI transmitted to the UE 502. That is, at least one of the first PEI or the second PEI transmitted to the UE 502 may indicate that the paging messages associated with at least one PO are transmitted, and the base station 504 may transmit the paging messages associated with the monitored POs to the UE 502. The UE 502 may receive paging messages associated with the POs of the first set of POs based on at least one of the first PEI or the second PEI received from the base station 504. That is, in response to the monitoring of at least one PO that the bitmap of the PEI indicates is associated with the paging message for the UE 502 or the UE group associated with the UE 502 at 514, the UE 502 may receive the paging messages associated with the monitored POs from the base station 504.

Figure 6:
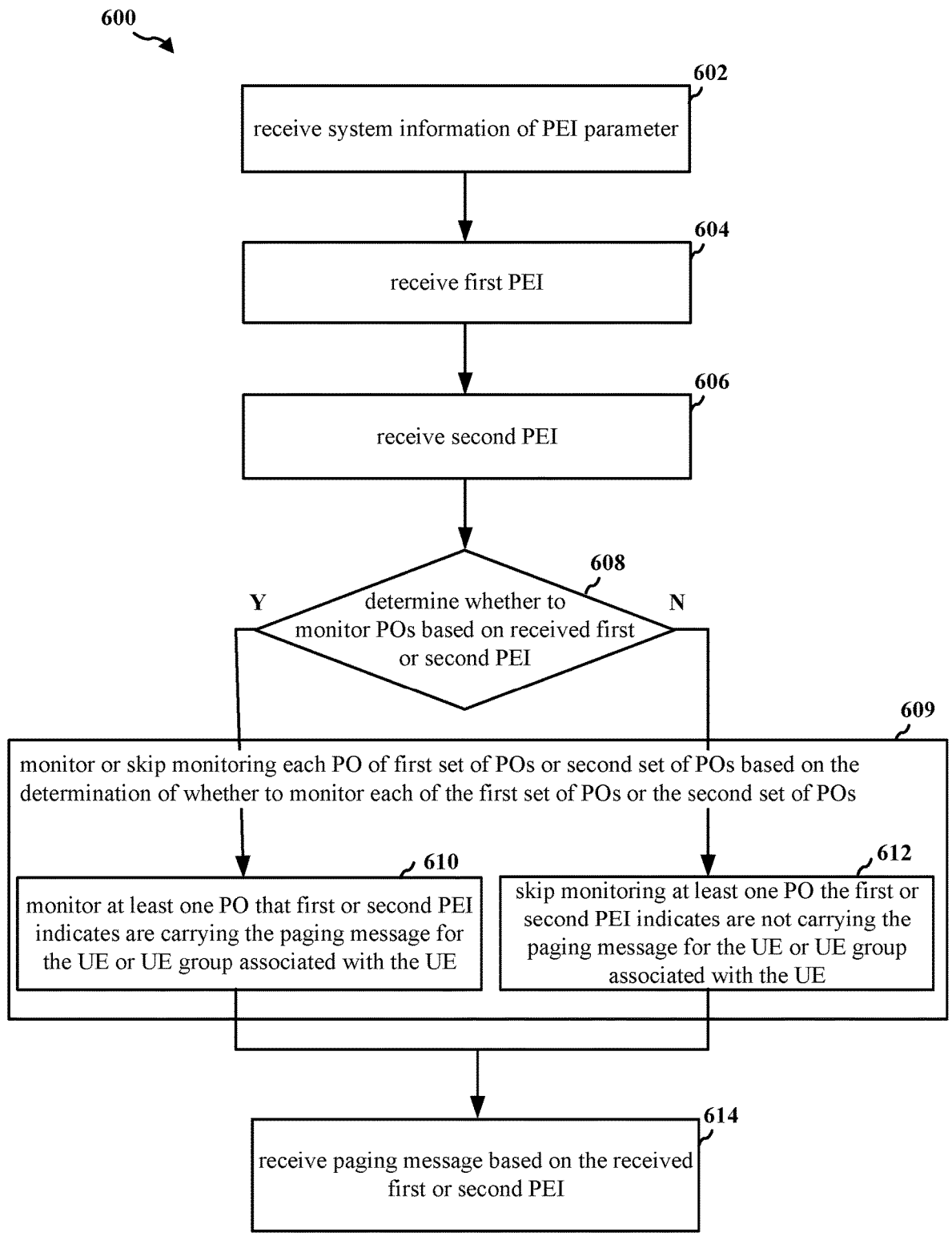
FIG. 6 is a flow chart of a method of wireless communication.

FIG. 6 is a flowchart 600 of a method of wireless communication. The method may be performed by a UE (e.g., the UE 104/502; the apparatus 1002). The method may enable the UE to receive a PEI including a paging indication of multiple POs from the base station to determine whether multiple POs include at least one PO associated with paging messages for the UE and determine whether to monitor or skip the multiple POs indicated by the received PEI.

At 602, the UE may receive the system information indicating the parameters for the PEI. In some aspects, the PEI parameters may include a number M associated with a number of POs in the first set of POs and a number N associated with a PEI periodicity in which PEIs are received every N POs. In one aspect, M may be a multiple of N, and a number M/N may correspond to a number of PEIs that include the same information associated with each PO of the first set of POs. In one example, M may be equal to N, and the number of POs associated with each PEI be the equal to the periodicity of the PEI. That is, one (1) PEI may be associated with each paging indication for each PO, and each paging indication may be transmitted in one (1) PEI. In one aspect, the PEI parameters may include a number K associated with a PO offset from each PEI and the first PO associated with each PEI. For example, at 506, the UE 502 may receive, from the base station 504 the system information indicating the parameters for the PEI. Furthermore, 602 may be performed by a PEI component 1040.

At 604, the UE may receive a first PEI indicating whether the UE has a paging message for reception associated with each PO of the first set of POs, the first set of POs including a first plurality of POs. In one aspect, the UE may receive the first PEI based on the received system information received at 602. In some aspects, the PEI may include at least one of a message including a system information modification or a public warning message, or a bitmap of the paging indications. In one aspect, the first PEI may include at least one of a system information modification message or a public warning message. The UE may determine to perform system information modification or receive the public warning message based on the first PEI including at least one of the system information modification message or the public warning message. For example, at 508, the UE 502 may receive the first PEI indicating whether the UE 502 has a paging message for reception associated with each PO of the first set of POs. Furthermore, 604 may be performed by the PEI component 1040.

At 606, the UE may receive a second PEI indicating whether the UE has a paging message for reception associated with each PO of the second set of POs, the second set of POs including a second plurality of POs. In one aspect, the first set of POs and the second set of POs may include a common subset of POs. In one aspect, the UE may receive the second PEI based on the received system information received at 602. In one aspect, the first set of POs and the second set of POs may include a common subset of POs. In some aspects, the PEI may include at least one of a message including a system information modification or a public warning message, or a bitmap of the paging indications. In one aspect, the second PEI may include at least one of a system information modification message or a public warning message. The UE may determine to perform system information modification or receive the public warning message based on the second PEI including at least one of the system information modification message or the public warning message. For example, at 510, the UE 502 may receive the second PEI indicating whether the UE 502 has a paging message for reception associated with each PO of the second set of PO. Furthermore, 606 may be performed by the PEI component 1040.

At 608, the UE may determine whether to monitor the POs of the first set of POs or the second set of POs based on at least one of the first PEI or the second PEI received from the base station. In some aspects, the bitmap of the paging indication in the PEI may include at least one bit corresponding to each PO in the set of POs associated with the PEI. That is, the PEI may include a bitmap indicating which PO of the set of POs associated with the PEI is associated with the UE. In some aspects, the bitmap may also indicate which UE of a UE group is associated with which PO of the set of the POs. Accordingly, the UE in the UE group sharing the same paging location may determine which PO is associated with the UE and monitor, among the set of POs, the PO associated with the UE. In one aspect, the bitmap may include at least one bit indicating that the corresponding PO of the set of POs is not associated with the first PEI. For example, at 512, the UE 502 may determine whether to monitor the POs of the first set of POs or the second set of POs based on at least one of the first PEI or the second PEI received from the base station. Furthermore, 608 may be performed by a paging message component 1042.

At 609, the UE may monitor or skip monitoring the POs of the first set of POs and/or the POs of the second set of POs based on the determination of whether to monitor each PO of the first set of POs or the second set of POs at 608. For example, at 513, the UE 502 may monitor or skip monitoring the POs of the first set of POs and/or the POs of the second set of POs based on the determination of whether to monitor each PO of the first set of POs or the second set of POs. At 610, the UE may monitor at least one PO that the bitmap of the PEI indicates is associated with the paging message for the UE or the UE group associated with the UE. For example, at 514, the UE 502 may monitor at least one PO that the bitmap of the PEI indicates is associated with the paging message for the UE 502 or the UE group associated with the UE 502. At 612, the UE may skip monitoring one or more POs that the bitmap of the PEI indicates may not be associated with the paging message for the UE or the UE group, including the UE. For example, at 516, the UE 502 may skip monitoring one or more POs that the bitmap of the PEI indicates may not be associated with the paging message for the UE 502 or the UE group, including the UE 502. Furthermore, 609, 610, and 612 may be performed by the paging message component 1042.

At 614, the UE may receive paging messages associated with the POs of the first set of POs or the second set of POs based on at least one of the first PEI or the second PEI received from the base station. That is, in response to the monitoring of at least one PO that the bitmap of the PEI indicates is associated with the paging message for the UE or the UE group associated with the UE at 610, the UE may receive the paging messages associated with the monitored POs from the base station. For example, at 518, the UE 502 may receive paging messages associated with the POs of the first set of POs or the second set of POs based on at least one of the first PEI or the second PEI received from the base station 504. Furthermore, 614 may be performed by the paging message component 1042.

Figure 7:
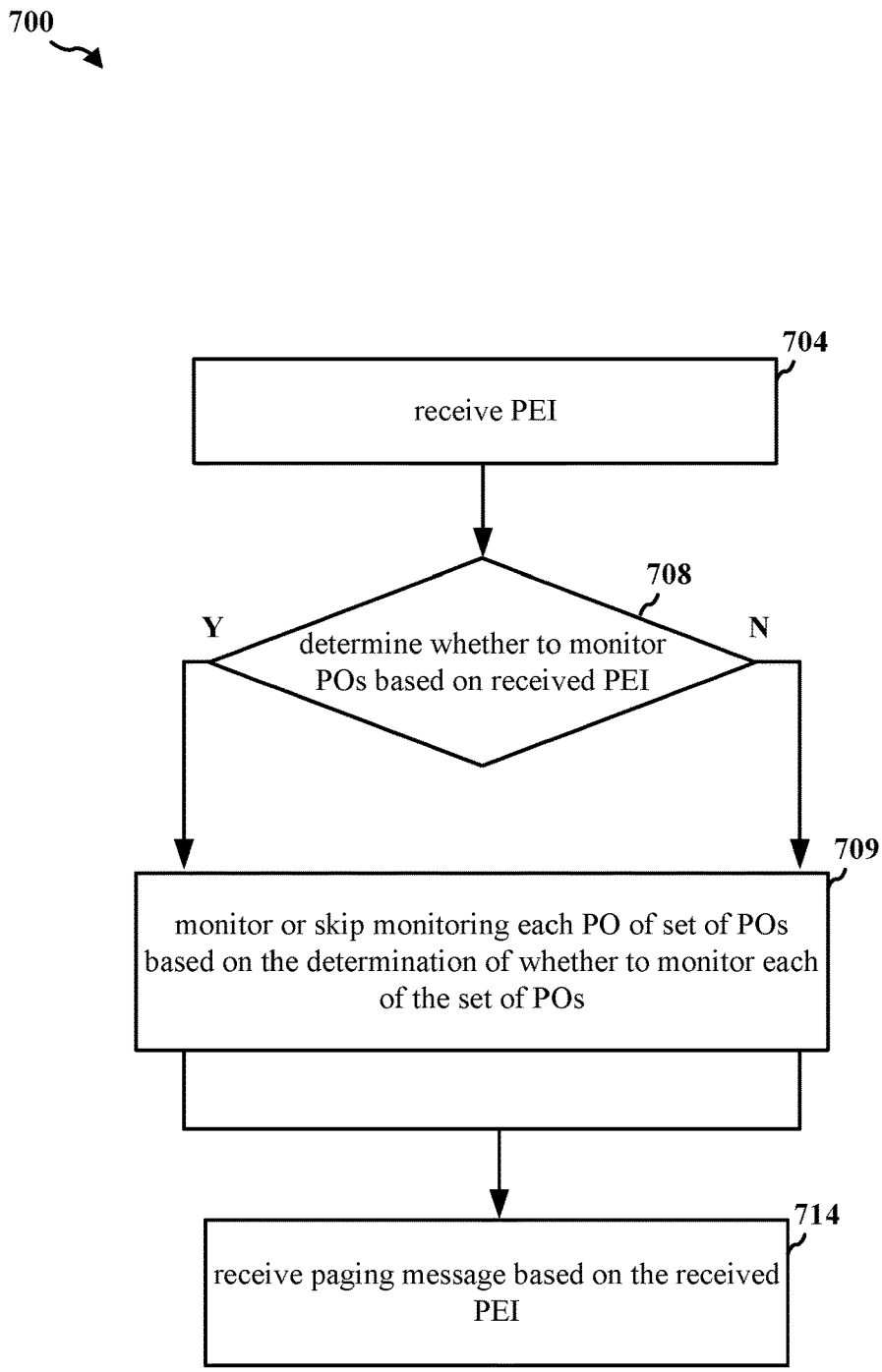
FIG. 7 is a flow chart of a method of wireless communication.

FIG. 7 is a flowchart 700 of a method of wireless communication. The method may be performed by a UE (e.g., the UE 104/502; the apparatus 1002). The method may enable the UE to receive a PEI including a paging indication of multiple POs from the base station to determine whether multiple POs include at least one PO associated with paging messages for the UE and determine whether to monitor or skip the multiple POs indicated by the received PEI.

At 704, the UE may receive a first PEI indicating whether the UE has a paging message for reception associated with each PO of the first set of POs, the first set of POs including a first plurality of POs. In one aspect, the UE may receive the first PEI based on the received system information. In some aspects, the PEI may include at least one of a message including a system information modification or a public warning message, or a bitmap of the paging indications. In one aspect, the first PEI may include at least one of a system information modification message or a public warning message. The UE may determine to perform system information modification or receive the public warning message based on the first PEI including at least one of the system information modification message or the public warning message. For example, at 508, the UE 502 may receive the first PEI indicating whether the UE 502 has a paging message for reception associated with each PO of the first set of POs. Furthermore, 704 may be performed by the PEI component 1040.

At 708, the UE may determine whether to monitor the POs of the first set of POs based on at least one of the first PEI received from the base station. In some aspects, the bitmap of the paging indication in the PEI may include at least one bit corresponding to each PO in the set of POs associated with the PEI. That is, the PEI may include a bitmap indicating which PO of the set of POs associated with the PEI is associated with the UE. In some aspects, the bitmap may also indicate which UE of a UE group is associated with which PO of the set of the POs. Accordingly, the UE in the UE group sharing the same paging location may determine which PO is associated with the UE and monitor, among the set of POs, the PO associated with the UE. In one aspect, the bitmap may include at least one bit indicating that the corresponding PO of the set of POs is not associated with the first PEI. For example, at 512, the UE 502 may determine whether to monitor the POs of the first set of POs based on at least one of the first PEI received from the base station. Furthermore, 708 may be performed by a paging message component 1042.

At 709, the UE may monitor or skip monitoring the POs of the first set of POs based on the determination of whether to monitor each PO of the first set of POs. For example, at 513, the UE 502 may monitor or skip monitoring the POs of the first set of POs based on the determination of whether to monitor each PO of the first set of POs. Furthermore, 709 may be performed by the paging message component 1042.

At 714, the UE may receive paging messages associated with the POs of the first set of POs based on at least one of the first PEI received from the base station. That is, in response to the monitoring of at least one PO that the bitmap of the PEI indicates is associated with the paging message for the UE or the UE group associated with the UE at 710, the UE may receive the paging messages associated with the monitored POs from the base station. For example, at 518, the UE 502 may receive paging messages associated with the POs of the first set of POs based on at least one of the first PEI received from the base station 504. Furthermore, 714 may be performed by the paging message component 1042.

Figure 8:
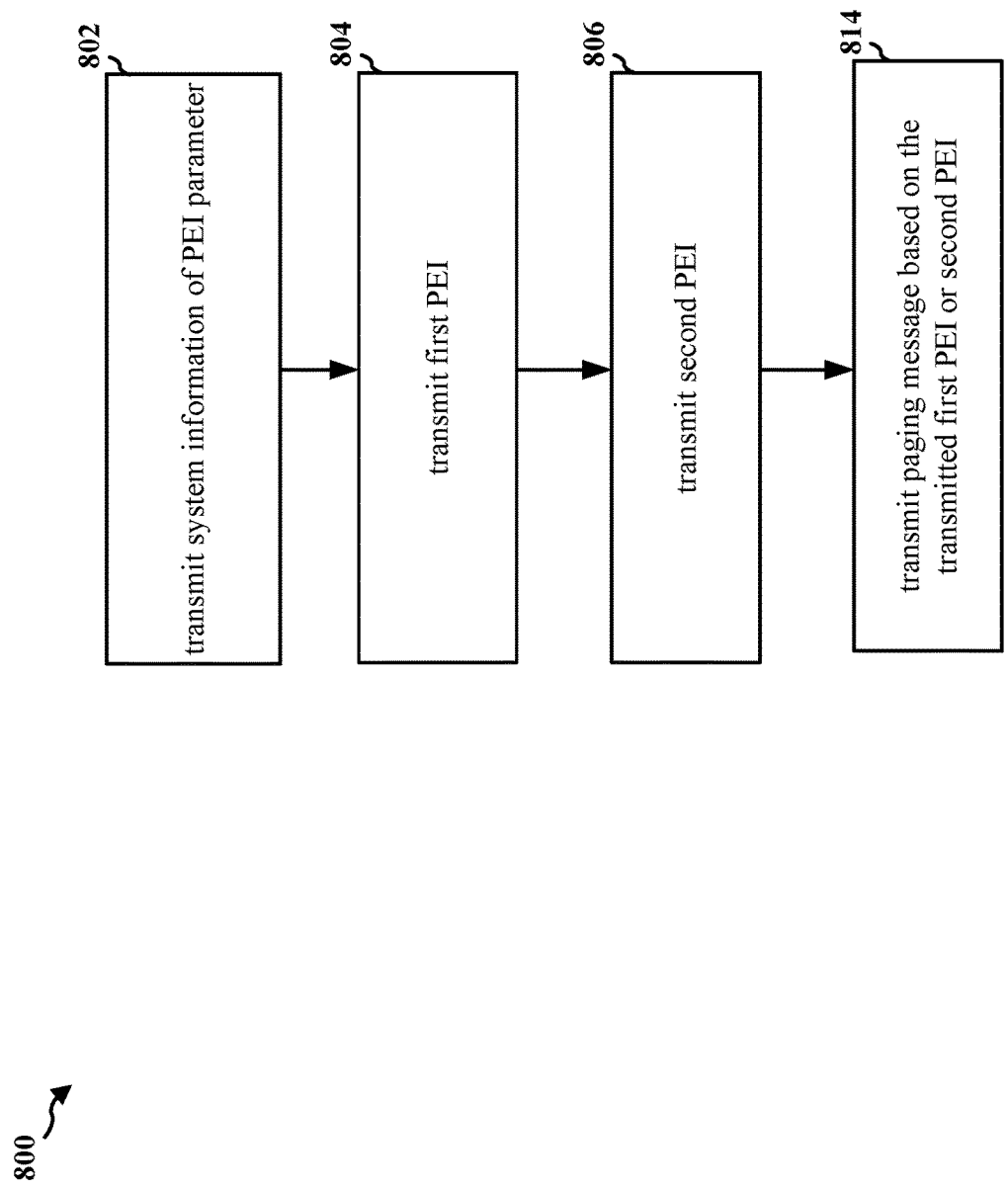
FIG. 8 is a flow chart of a method of wireless communication.

FIG. 8 is a flowchart 800 of a method of wireless communication. The method may be performed by a base station (e.g., the base station 102/180/504; the apparatus 1102). The method may enable the base station to transmit a PEI including paging indication of multiple POs to the UE to indicate at least one PO associated with paging messages for the UE and enable the UE to determine whether to monitor or skip the multiple POs indicated by the received PEI.

At 802, the base station may transmit system information indicating PEI parameters for communicating the PEI. In some aspects, the PEI parameters may include a number M associated with a number of POs in the first set of POs and a number N associated with a PEI periodicity in which PEIs are received every N POs. In one aspect, M may be a multiple of N, and a number M/N may correspond to a number of PEIs that include the same information associated with each PO of the first set of POs. In one example, the M may be equal to N, and the number of POs associated with each PEI be the equal to the periodicity of the PEI. That is, one (1) PEI may be associated with each paging indication for each PO, and each paging indication may be transmitted in one (1) PEI. In one aspect, the PEI parameters may include a number K associated with a PO offset from each PEI and the first PO associated with each PEI. For example, at 506, the base station 504 may transmit system information indicating PEI parameters for communicating the PEI. Furthermore, 802 may be performed by a PEI component 1140.

At 804, the base station may transmit a first PEI indicating whether the UE has a paging message for reception associated with each PO of the first set of POs, the first set of POs including a first plurality of POs. In one aspect, the base station may transmit the first PEI based on the system information transmitted at 802. In some aspects, the PEI may include at least one of a message including a system information modification or a public warning message, or a bitmap of the paging indications. In one aspect, the first PEI may include at least one of a system information modification message or a public warning message. The UE may determine to perform system information modification or receive the public warning message based on the first PEI including at least one of the system information modification message or the public warning message. For example, at 508, the base station 504 may transmit a first PEI indicating whether the UE 502 has a paging message for reception associated with each PO of the first set of POs, the first set of POs including a first plurality of POs. Furthermore, 804 may be performed by the PEI component 1140.

At 806, the base station may transmit a second PEI subsequent to the first PEI, indicating whether the UE has a paging message for reception associated with each PO of the second set of POs, the second set of POs including a second plurality of POs. In one aspect, the base station may transmit the second PEI based on the system information transmitted at 802. In one aspect, the first set of POs and the second set of POs may include a common subset of POs. In some aspects, the PEI may include at least one of a message including a system information modification or a public warning message, or a bitmap of the paging indications. In one aspect, the second PEI may include at least one of a system information modification message or a public warning message. The UE may determine to perform system information modification or receive the public warning message based on the second PEI including at least one of the system information modification message or the public warning message. For example, at 510, the base station 504 may transmit a second PEI subsequent to the first PEI, indicating whether the UE 502 has a paging message for reception associated with each PO of the second set of POs, the second set of POs including a second plurality of POs. Furthermore, 806 may be performed by the PEI component 1140.

At 814, the base station may transmit paging messages associated with the POs of the first set of POs or the second set of POs based on at least one of the first PEI or the second PEI transmitted to the UE. That is, at least one of the first PEI or the second PEI transmitted to the UE may indicate that the paging messages associated with at least one PO are transmitted, and the base station may transmit the paging messages associated with the monitored POs to the UE. For example, at 518, the base station 504 may transmit paging messages associated with the POs of the first set of POs or the second set of POs based on at least one of the first PEI or the second PEI transmitted to the UE 502. Furthermore, 814 may be performed by a paging message component 1142.

Figure 9:
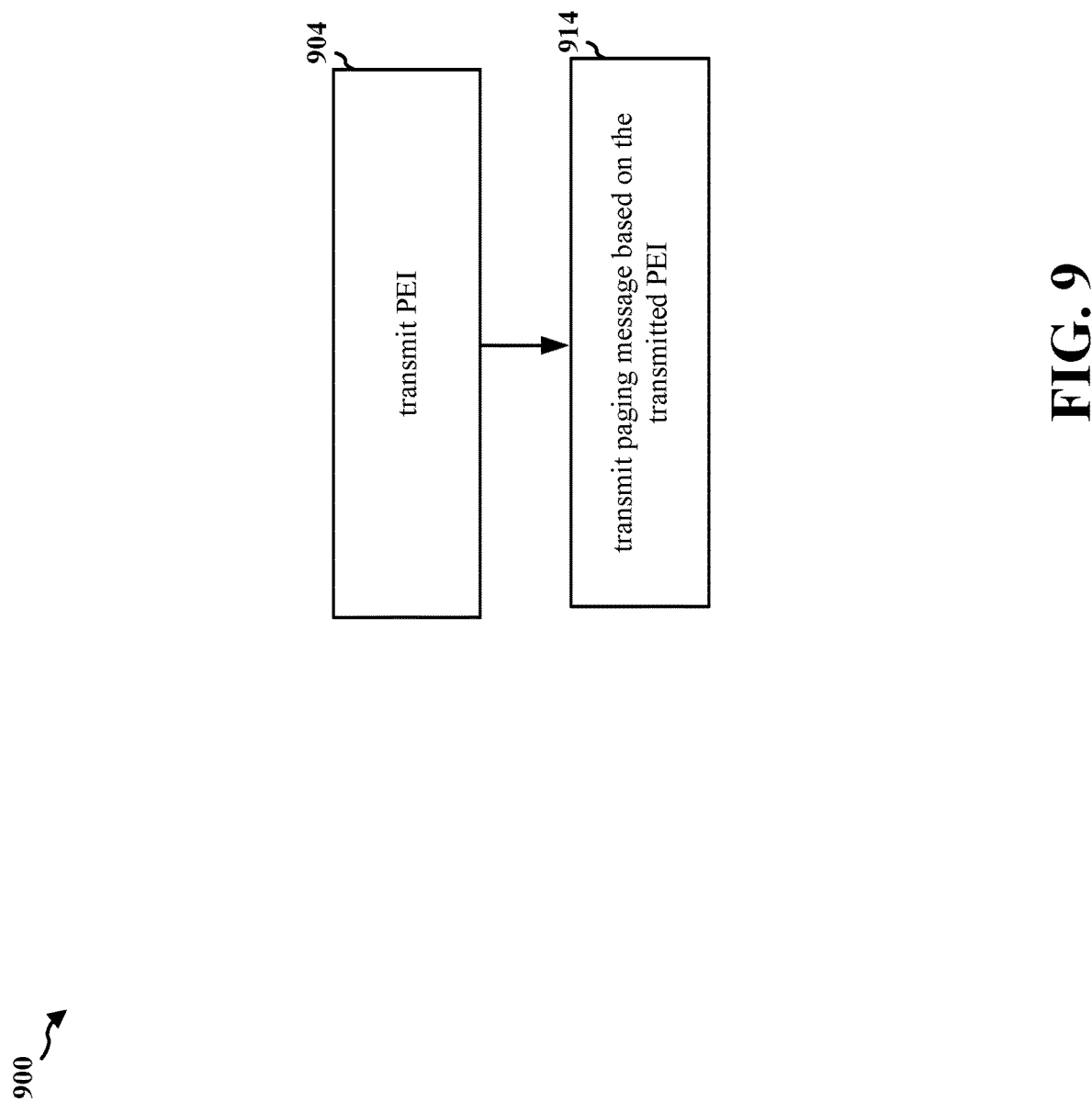
FIG. 9 is a flow chart of a method of wireless communication.

FIG. 9 is a flowchart 900 of a method of wireless communication. The method may be performed by a base station (e.g., the base station 102/180/504; the apparatus 1102). The method may enable the base station to transmit a PEI including paging indication of multiple POs to the UE to indicate at least one PO associated with paging messages for the UE and enable the UE to determine whether to monitor or skip the multiple POs indicated by the received PEI.

At 904, the base station may transmit a first PEI indicating whether the UE has a paging message for reception associated with each PO of the first set of POs, the first set of POs including a first plurality of POs. In one aspect, the base station may transmit the first PEI based on the system information transmitted at 902. In some aspects, the PEI may include at least one of a message including a system information modification or a public warning message, or a bitmap of the paging indications. In one aspect, the first PEI may include at least one of a system information modification message or a public warning message. The UE may determine to perform system information modification or receive the public warning message based on the first PEI including at least one of the system information modification message or the public warning message. For example, at 508, the base station 504 may transmit a first PEI indicating whether the UE 502 has a paging message for reception associated with each PO of the first set of POs, the first set of POs including a first plurality of POs. Furthermore, 904 may be performed by the PEI component 1140.

At 914, the base station may transmit paging messages associated with the POs of the first set of POs based on at least one of the first PEI transmitted to the UE. That is, at least one of the first PEI transmitted to the UE may indicate that the paging messages associated with at least one PO are transmitted, and the base station may transmit the paging messages associated with the monitored POs to the UE. For example, at 518, the base station 504 may transmit paging messages associated with the POs of the first set of POs based on at least one of the first PEI transmitted to the UE 502. Furthermore, 914 may be performed by a paging message component 1142.

Figure 10:
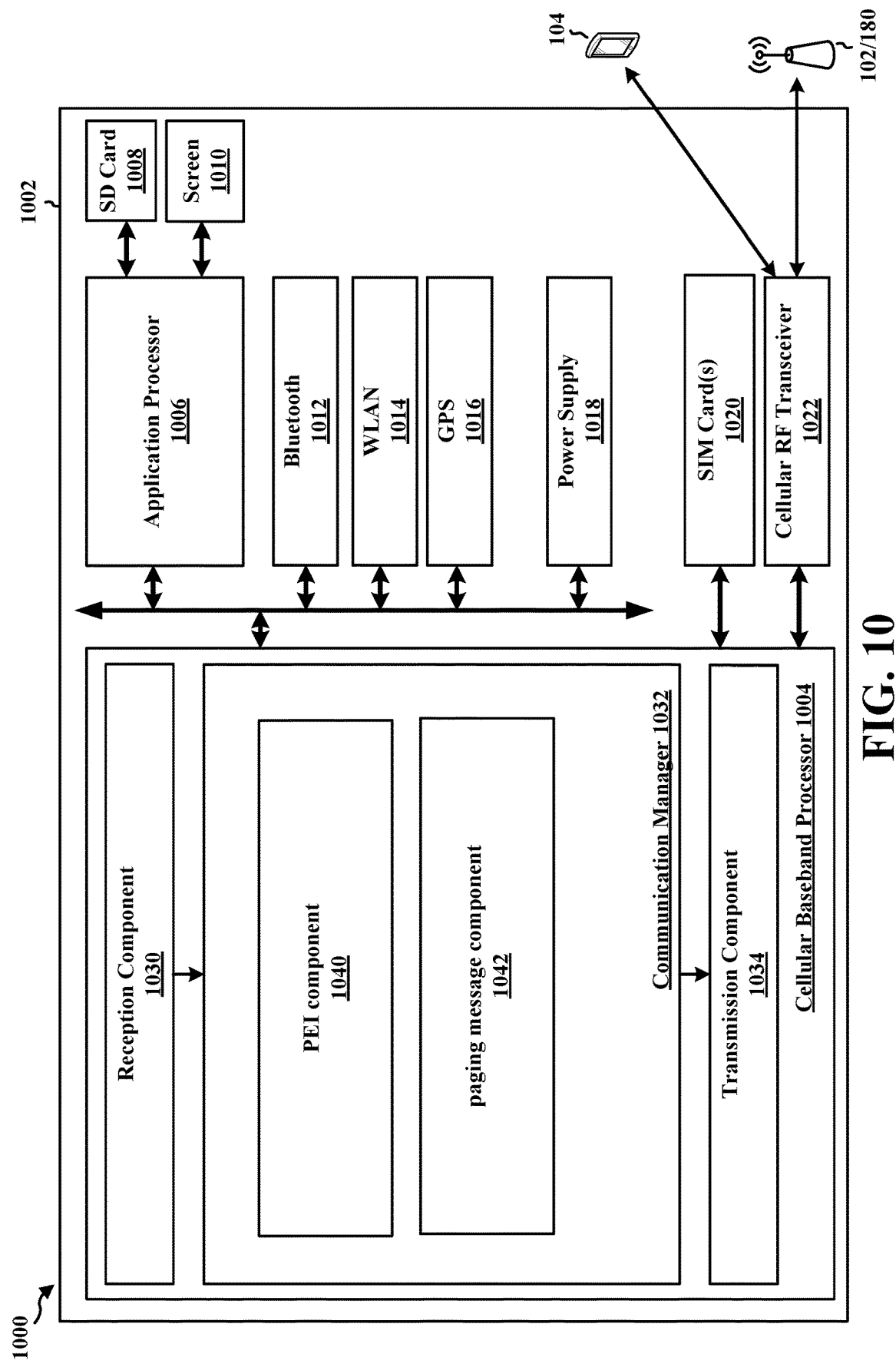
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a PEI component 1040 that is configured to receive the system information indicating the parameters for the PEI, and receive a PEI indicating whether the UE has a paging message for reception associated with each PO of a set of POs, the set of POs including a plurality of POs, e.g., as described in connection with 602, 604, 606, and 704. The communication manager 1032 further includes a paging message component 1042 that is configured to determine whether to monitor the POs of the set of POs based on the received PEI, monitor or skip monitoring the POs of the set of POs based on the determination of whether to monitor each PO of the first set of POs, and receive paging messages associated with the POs of the set of POs based on the received PEI, e.g., as described in connection with 608, 609, 610, 612, 614, 708, 709, and 714.

The apparatus may include additional components that perform each PO of the blocks of the algorithm in the aforementioned flowcharts of FIGS. 5, 6, and 7. As such, each block in the aforementioned flowcharts of FIGS. 5, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for receiving a PEI indicating whether the UE has a paging message for reception associated with each PO of a set of POs including a plurality of POs, means for determining whether to monitor the POs of the set of POs based on the received PEI, and means for monitoring or skipping monitoring the POs of the set of POs based on the determination of whether to monitor each PO of the set of POs. The apparatus 802 includes means for receiving system information indicating at least one PEI parameter from the base station. The apparatus 802 includes means for monitoring at least one PO that the bitmap indicates is associated with the paging message for the UE or the UE group associated with the UE, and means for skipping monitoring one or more POs that the bitmap indicates are not associated with the paging message for the UE or the UE group associated with the UE. The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
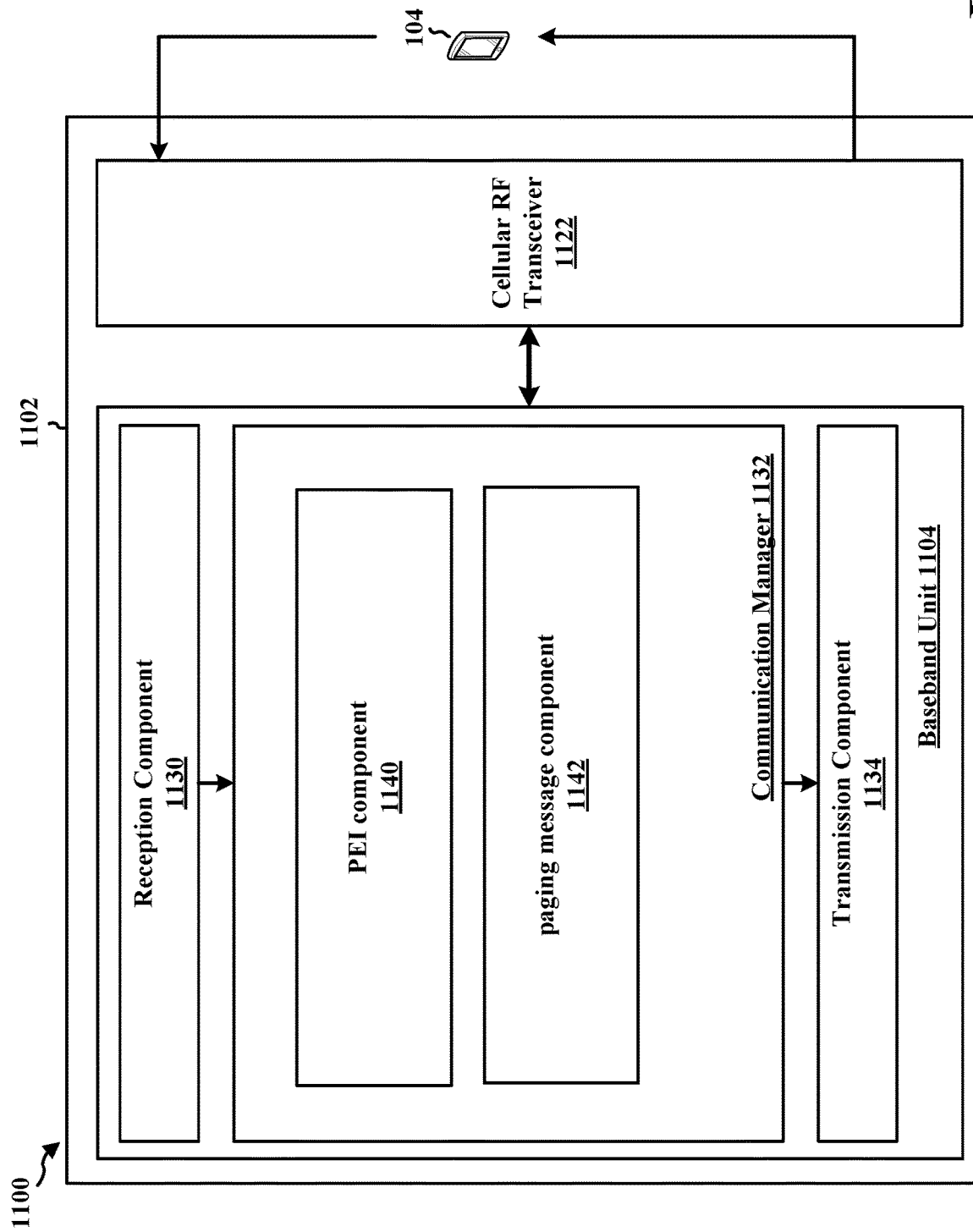
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1002 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a PEI component 1140 that is configured to transmit system information indicating PEI parameters for communicating the PEI, and transmit a PEI indicating whether the UE has a paging message for reception associated with each PO of the set of POs including a plurality of POs, e.g., as described in connection with 802, 804, 806, and 904. The communication manager 1132 further includes a paging message component 1142 that is configured to transmit paging messages associated with the POs of the set of POs based on the received PEI, e.g., as described in connection with 808, 814, and 914.

The apparatus may include additional components that perform each of the blocks of the algorithm in the aforementioned flowcharts of FIGS. 5, 8, and 9. As such, each block in the aforementioned flowcharts of FIGS. 5, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for transmitting a PEI indicating whether the UE has a paging message for reception associated with each PO of a set of POs including a plurality of POs, and means for transmitting paging messages associated with the POs of the set of POs based on the PEI transmitted to the UE. The apparatus 1102 includes means for transmitting system information indicating at least one PEI parameter to the UE. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

A base station may transmit a PEI indicating whether a UE has a paging message for reception associated with each PO of a set of POs including a plurality of POs, and transmit paging messages associated with the POs of the set of POs based on the PEI transmitted to the UE. The base station may transmit system information including PEI parameters. The UE may receive the PEI parameters and receive the PEI indicating whether the UE has a paging message for reception associated with each PO of a set of POs based on the PEI parameters, determining whether to monitor the POs of the set of POs based on the received PEI, and monitor or skipping monitoring the POs of the set of POs based on the determination of whether to monitor each PO of the set of POs.

In one aspect, the system information may indicate a number M associated with a number of POs in the set of POs, and a number N associated with a PEI periodicity in which PEIs are received every N POs. The M may be a multiple of N and a number M/N corresponds to a number of PEIs that include a same information associated with each PO of the set of POs. In one example, M may be equal to N.

The system information may further indicate a number K associated with a PO offset from each PEI and the PO associated with each PEI.

In some aspects, the PEI may include at least one of a system information modification message or a public warning message and a bitmap, each bit indicating whether corresponding PO of the set of POs includes a paging message for the UE or a UE group associated with the UE. The monitoring or skipping monitoring may include monitoring at least one PO that the bitmap indicates is associated with the paging message for the UE or the UE group associated with the UE, and skipping monitoring one or more POs that the bitmap indicates are not associated with the paging message for the UE or the UE group associated with the UE. In one aspect, at least one bit of the bitmap may indicate that the corresponding PO of the set of POs is not associated with the PEI.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, the method including receiving, from a base station, a first PEI indicating whether the UE has a paging message for reception associated with each PO of the first set of POs, the first set of POs including a first plurality of POs, determining whether to monitor the POs of the first set of POs based on the received first PEI, and monitoring or skipping monitoring the POs of the first set of POs based on the determination of whether to monitor each PO of the first set of POs.

Aspect 2 is the method of aspect 1, further including receiving, from the base station, a second PEI subsequent to the first PEI indicating whether the UE has a paging message for reception associated with each PO of the second set of POs, the second set of POs including a second plurality of POs, the first set of POs and the second set of POs including a common subset of POs.

Aspect 3 is the method of aspect 2, where the first set of POs and the second set of POs includes a common subset of POs.

Aspect 4 is the method of aspect 3, further including determining whether to monitor each PO of the first set of POs includes determining at least one of the first PEI or the second PEI to decode to determine whether to monitor each PO of the common subset of POs of the first set of POs.

Aspect 5 is the method of any of aspects 1 to 4, further including receiving system information indicating a number M associated with a number of POs in the first set of POs, and a number N associated with a PEI periodicity in which PEIs are received every N POs, where the first PEI is received based on the received system information.

Aspect 6 is the method of aspect 5, where the number M associated with the number of POs in the first set of POs is equal to the number N associated with the PEI periodicity.

Aspect 7 is the method of aspect 5, where M is a multiple of N and a number M/N corresponds to a number of PEIs that include the same information associated with each PO of the first set of POs.

Aspect 8 is the method of any of aspects 4 and 7, where the system information further indicates a number K associated with a PO offset from each PEI and the first PO associated with each PEI.

Aspect 9 is the method of any of aspects 1 to 8, where the first PEI includes at least one of a system information modification message or a public warning message.

Aspect 10 is the method of any of aspects 1 to 9, where the first PEI includes a bitmap, each bit indicating whether the corresponding PO of the first set of POs includes a paging message for the UE or a UE group associated with the UE, where monitoring or skipping monitoring includes monitoring at least one PO that the bitmap indicates is associated with the paging message for the UE or the UE group associated with the UE, and skipping monitoring one or more POs that the bitmap indicates are not associated with the paging message for the UE or the UE group associated with the UE.

Aspect 11 is the method of aspect 10, where at least one bit of the bitmap indicates that the corresponding PO of the first set of POs is not associated with the first PEI.

Aspect 12 is an apparatus for wireless communication including at least one processor coupled to a memory and configured to implement a method as in any of aspects 1 to 11, further including a transceiver coupled to the at least one processor.

Aspect 13 is an apparatus for wireless communication including means for implementing a method as in any of aspects 1 to 11.

Aspect 14 is a computer-readable medium storing computer executable code, where the code when executed by a processor causes the processor to implement a method as in any of aspects 1 to 11.

Aspect 15 is a method of wireless communication at a base station, the method including transmitting, for a UE, a first PEI indicating whether the UE has a paging message for reception associated with each PO of the first set of POs, the first set of POs including a first plurality of POs, and transmitting one or more paging messages associated with the POs of the first set of POs based on the first PEI transmitted for the UE, the one or more paging messages including the first paging message.

Aspect 16 is the method of aspect 15, further including transmitting, for the UE, a second PEI subsequent to the first PEI indicating whether the UE has a second paging message for reception associated with each PO of a second set of POs, the second set of POs including a second plurality of POs Aspect 17 is the method of aspect 16, where the first set of POs and the second set of POs including a common subset of POs.

Aspect 18 is the method of any of aspects 15 to 17, further including transmitting system information indicating a number M associated with a number of POs in the first set of POs, and a number N associated with a PEI periodicity in which PEIs are received every N POs, where the first PEI is transmitted based on the system information transmitted for the UE.

Aspect 19 is the method of aspect 18, where the number M associated with the number of POs in the first set of POs is equal to the number N associated with the PEI periodicity.

Aspect 20 is the method of aspect 18, where M is a multiple of N, and a number M/N corresponds to a number of PEIs that include the same information associated with each PO of the first set of POs.

Aspect 21 is the method of aspect 18, where the system information further indicates a number K associated with a PO offset from each PEI and the first PO associated with each PEI.

Aspect 22 is the method of any of aspects 15 to 21, where the first PEI includes at least one of a system information modification message or a public warning message.

Aspect 23 is the method of any of aspects 15 to 21, where each entry includes a bitmap, each bit indicating whether the corresponding PO of the first set of POs includes a paging message for the UE or a UE group associated with the UE, where transmitting paging messages associated with the POs includes transmitting, for the UE or the UE group associated with the UE, paging messages in the POs that the bitmap indicates is associated with the paging message for the UE or the UE group associated with the UE in the PO.

Aspect 24 is the method of aspect 23, where at least one bit of the bitmap indicates that the corresponding PO of the first set of POs is not associated with the first PEI.

Aspect 25 is an apparatus for wireless communication including at least one processor coupled to a memory and configured to implement a method as in any of aspects 15 to 24, further including a transceiver coupled to the at least one processor.

Aspect 26 is an apparatus for wireless communication including means for implementing a method as in any of aspects 15 to 24.

Aspect 27 is a computer-readable medium storing computer executable code, where the code when executed by a processor causes the processor to implement a method as in any of aspects 15 to 24.

What is claimed is:

1. An apparatus for wireless communication at a user equipment (UE), comprising:
memory; and
at least one processor coupled to the memory and configured to:
receive, from a base station, a first paging early indication (PEI) indicating whether the UE monitors a first paging message for reception associated with each paging occasion (PO) of a first set of POs, the first set of POs including a first plurality of POs, wherein the first PEI includes a bitmap, at least one bit of the bitmap indicating whether the UE monitors corresponding PO of the first set of POs for the first paging message, wherein the corresponding PO is for the UE or a UE group associated with the UE;
determine whether to monitor the each PO of the first set of POs based on the received first PEI; and
monitor at least one PO that the bitmap indicates to be associated with the first paging message for the UE or skip monitoring one or more POs of the first set of POs that the bitmap indicates to be not associated with the first paging message for the UE.

2. The apparatus of claim 1, further comprising a transceiver coupled to the at least one processor, and
wherein the at least one processor is configured to receive, from the base station, a second PEI subsequent to the first PEI indicating whether the UE has a second paging message for reception associated with each PO of a second set of POs, the second set of POs including a second plurality of POs.

3. The apparatus of claim 2, wherein the first set of POs and the second set of POs includes a common subset of POs.

4. The apparatus of claim 3, wherein, to determine whether to monitor each PO of the first set of POs, the at least one processor is further configured to determine at least one of the first PEI or the second PEI to decode to determine whether to monitor each PO of the common subset of POs of the first set of POs.

5. The apparatus of claim 1, wherein the at least one processor is further configured to receive system information indicating a number M that represents a number of POs in the first set of POs, and a number N that represents a PEI periodicity in which PEIs are received every N POs, and
wherein to receive the first PEI, the at least one processor is configured to receive the first PEI based on the received system information.

6. The apparatus of claim 5, wherein the number M that represents the number of POs in the first set of POs is equal to the number N that represents the PEI periodicity.

7. The apparatus of claim 5, wherein M is a multiple of N and a number M/N corresponds to a number of PEIs that include a same information associated with each PO of the first set of POs.

8. The apparatus of claim 5, wherein the system information further indicates a number K that represents a PO offset from each PEI and the first PO associated with each PEI.

9. The apparatus of claim 1, wherein at least one first bit of the bitmap indicates that the corresponding PO of the first set of POs is not associated with the first PEI.

10. An apparatus of wireless communication at a base station, comprising:
memory; and
at least one processor coupled to the memory and configured to:
transmit, for a user equipment (UE), a first paging early indication (PEI) indicating whether the UE monitors a first paging message for reception associated with each paging occasion (PO) of a first set of POs, the first set of POs including a first plurality of POs, wherein the first PEI includes a bitmap, at least one bit of the bitmap indicating whether the UE monitors corresponding PO of the first set of POs for the first paging message, wherein the corresponding PO is for the UE or a UE group associated with the UE; and
transmit, for the UE or the UE group associated with the UE, one or more paging messages in each PO of the first set of POs that the bitmap indicates to be associated with the first paging message for the UE or the UE group associated with the UE in the PO and refrain from transmitting one or more POs that the bitmap indicates to be not associated with the first paging message for the UE, the one or more paging messages being associated with the each PO of the first set of POs based on the first PEI transmitted for the UE, the one or more paging messages including the first paging message.

11. The apparatus of claim 10, further comprising a transceiver coupled to the at least one processor, and
wherein the at least one processor is configured to transmit, for the UE, a second PEI subsequent to the first PEI indicating whether the UE has a second paging message for reception associated with each PO of a second set of POs, the second set of POs including a second plurality of POs.

12. The apparatus of claim 11, wherein the first set of POs and the second set of POs including a common subset of POs.

13. The apparatus of claim 10, wherein the at least one processor is further configured to transmit system information indicating a number M that represents a number of POs in the first set of POs, and a number N that represents a PEI periodicity in which PEIs are received every N POs, and
wherein to transmit the first PEI, the at least one processor is configured to transmit the first PEI based on the system information transmitted for the UE.

14. The apparatus of claim 13, wherein the number M that represents the number of POs in the first set of POs is equal to the number N that represents the PEI periodicity.

15. The apparatus of claim 13, wherein M is a multiple of N and a number M/N corresponds to a number of PEIs that include a same information associated with each PO of the first set of POs.

16. The apparatus of claim 13, wherein the system information further indicates a number K that represents a PO offset from each PEI and the first PO associated with each PEI.

17. The apparatus of claim 10, wherein at least one first bit of the bitmap indicates that the corresponding PO of the first set of POs is not associated with the first PEI.

18. A method of wireless communication at a user equipment (UE), comprising:
receiving, from a base station, a first paging early indication (PEI) indicating whether the UE monitors a first paging message for reception associated with each paging occasion (PO) of a first set of POs, the first set of POs including a first plurality of POs, wherein the first PEI includes a bitmap, at least one bit of the bitmap indicating whether the UE monitors corresponding PO of the first set of POs for the first paging message, wherein the corresponding PO is for the UE or a UE group associated with the UE;
determining whether to monitor the each PO of the first set of POs based on the received first PEI; and
monitoring at least one PO that the bitmap indicates to be associated with the first paging message for the UE or skip monitoring one or more POs of the first set of POs that the bitmap indicates to be not associated with the first paging message for the UE.

19. The method of claim 18, further comprising receiving, from the base station, a second PEI subsequent to the first PEI indicating whether the UE has a second paging message for reception associated with each PO of a second set of POs, the second set of POs including a second plurality of POs.

20. The method of claim 18, further comprising receiving system information indicating a number M that represents a number of POs in the first set of POs, and a number N that represents a PEI periodicity in which PEIs are received every N POs, wherein the first PEI is received based on the received system information.

21. The method of claim 20, wherein the number M that represents the number of POs in the first set of POs is equal to the number N associated with the PEI periodicity.

22. The method of claim 20, wherein the system information further indicates a number K that represents a PO offset from each PEI and the first PO associated with each PEI.

23. A method of wireless communication at a base station, comprising:
transmitting, for a user equipment (UE), a first paging early indication (PEI) indicating whether the UE monitors a first paging message for reception associated with each paging occasion (PO) of a first set of POs, the first set of POs including a first plurality of POs, wherein the first PEI includes a bitmap, at least one bit of the bitmap indicating whether the UE monitors corresponding PO of the first set of POs for the first paging message, wherein the corresponding PO is for the UE or a UE group associated with the UE; and
transmitting, for the UE or the UE group associated with the UE, one or more paging messages in each PO of the first set of POs that the bitmap indicates to be associated with the first paging message for the UE or the UE group associated with the UE in the PO and refraining from transmitting one or more POs that the bitmap indicates to be not associated with the first paging message for the UE, the one or more paging messages being associated with the each PO of the first set of POs based on the first PEI transmitted for the UE, the one or more paging messages including the first paging message.

24. The method of claim 23, further comprising transmitting, for the UE, a second PEI subsequent to the first PEI indicating whether the UE has a second paging message for reception associated with each PO of a second set of POs, the second set of POs including a second plurality of POs.

25. The method of claim 23, further comprising transmitting system information indicating a number M that represents a number of POs in the first set of POs, and a number N that represents a PEI periodicity in which PEIs are received every N POs,
wherein the first PEI is transmitted based on the system information transmitted for the UE.

26. The method of claim 25, wherein the number M that represents the number of POs in the first set of POs is equal to the number N that represents the PEI periodicity.

* * * * *